United States Patent
Dotan et al.

(10) Patent No.: US 9,154,304 B1
(45) Date of Patent: Oct. 6, 2015

(54) USING A TOKEN CODE TO CONTROL ACCESS TO DATA AND APPLICATIONS IN A MOBILE PLATFORM

(71) Applicant: EMC Corporation, Hopkinton, MA (US)

(72) Inventors: Yedidya Dotan, Newton, MA (US); William M. Duane, Westford, MA (US)

(73) Assignee: EMC Corporation, Hopkinton, MA (US)

( * ) Notice: Subject to any disclaimer, the term of this patent is extended or adjusted under 35 U.S.C. 154(b) by 106 days.

(21) Appl. No.: 13/804,663

(22) Filed: Mar. 14, 2013

(51) Int. Cl.
*H04L 29/06* (2006.01)
*H04L 9/32* (2006.01)

(52) U.S. Cl.
CPC .............. *H04L 9/3226* (2013.01); *H04L 9/3244* (2013.01)

(58) Field of Classification Search
None
See application file for complete search history.

(56) References Cited

U.S. PATENT DOCUMENTS

| 8,799,655 B1 | 8/2014 | Dotan et al. |
| 2005/0166263 A1* | 7/2005 | Nanopoulos et al. ............. 726/7 |
| 2006/0041759 A1* | 2/2006 | Kaliski et al. ................. 713/184 |
| 2011/0161076 A1* | 6/2011 | Davis et al. ................... 704/231 |
| 2011/0211690 A1* | 9/2011 | Tu et al. .......................... 380/44 |
| 2011/0319056 A1* | 12/2011 | Toy et al. .................. 455/412.2 |

* cited by examiner

*Primary Examiner* — Harunur Rashid
*Assistant Examiner* — Andrew Steinle
(74) *Attorney, Agent, or Firm* — Ryan, Mason & Lewis, LLP (57) ABSTRACT

Methods, apparatus and articles of manufacture for using a token code to control access to data and applications in a mobile platform are provided herein. A method includes processing authentication information via a cryptographic operation to generate an output, partitioning the output into (i) a component that identifies the authentication information and (ii) an encryption key component, encrypting an item of cryptographic information via the encryption key component, and storing the component that identifies the authentication information and the encrypted item of cryptographic information.

20 Claims, 8 Drawing Sheets

USING A TOKEN CODE TO CONTROL ACCESS TO DATA AND APPLICATIONS IN A MOBILE PLATFORM

FIELD

The field relates generally to cryptography, and more particularly to mobile data and application protection.

BACKGROUND

Authentication tokens are commonly used for authenticating a user to a server over an insecure channel. By way of illustration, an authentication token shares one or more items of information with an authentication server, wherein such information is typically not known to other entities, and wherein such information allows the generation and verification of at least parts of an authentication string. This authentication string commonly includes, or is a function of, information that is memorized by the owner of the token and also stored on the server. The authentication can include a variety of formats, such as interactive (for example, a challenge-response format) or non-interactive (for example, no information is sent from the server to the user/token in order to complete the generation of the authentication string).

In a common scenario, information that constitutes an authentication attempt is sent over a potentially insecure communication link, such as a wireless or wired network. In one example, a user in possession of an authentication token aims to access a resource controlled by a server. The server can be assumed to be secure against attacks, thereby rendering the secret information stored by the server as precluded from being compromised and used for purposes of impersonation of the user in question. The above-mentioned resource may include, for example, a database, an electronic mail (e-mail) account, a storage unit, and/or processing ability.

Systems such as detailed above, however, may not be effective when the authentication server is not available, or may be impractical if the resource to which access is desired is a device of which the token owner is in possession. Under such circumstances, it would be beneficial if the device were able to verify the authentication code without interaction with the remote authentication server. However, if the device (such as, for example, a mobile phone or smart phone) is lost, stolen, or otherwise controlled by an attacker (or unwanted party other than the owner/user), this attacker could potentially obtain and use verification information (that is, the token) to attempt to impersonate the owner/user to the remote authentication server.

Accordingly, a need exists to protect data on a mobile device without keeping or storing the key (that is, the key responsible for encrypting the data sought for protection) on the mobile device.

SUMMARY

One or more illustrative embodiments of the present invention provide techniques for using a token code to control access to data and applications in a mobile platform.

In accordance with an aspect of the invention, a method is provided comprising the steps of processing authentication information via a cryptographic operation to generate an output, partitioning the output into (i) a component that identifies the authentication information and (ii) an encryption key component, encrypting an item of cryptographic information via the encryption key component, and storing the component that identifies the authentication information and the encrypted item of cryptographic information.

In accordance with another aspect of the invention, a method is provided comprising the steps of processing authentication information via a cryptographic operation to generate an output, partitioning the output into (i) a component that identifies the authentication information and (ii) a decryption key component, determining whether the component that identifies the authentication information matches a stored component, and decrypting a stored encrypted item of cryptographic information via the decryption key component if the component that identifies the authentication information matches a stored component, wherein the stored encrypted item of cryptographic information is associated with the stored component.

The data protection techniques of the illustrative embodiments overcome one or more of the problems associated with the conventional techniques described previously. These and other features and advantages of the present invention will become more readily apparent from the accompanying drawings and the following detailed description.

DETAILED DESCRIPTION

As will be described, the present invention, in one or more illustrative embodiments, provides techniques for using a token code to control access to data and applications in a mobile platform. In at least one embodiment of the invention, a server downloads a series of authentication records to a mobile device (such as a mobile phone or a smart phone) that has been authenticated to the server. As described in greater detail herein, a cryptographic function (such as a hash algorithm, an encryption, etc.) can receive, as input, a token output value, a salt value and a pepper value. The resulting output, a portion of which is downloaded from the server, is stored on the mobile device as part of a record. Accordingly, the particular user is authenticated to the mobile device if the token output is provided by the user and a cryptographic function output of the token data, salt value, and pepper value matches the record.

Illustrative embodiments of the present invention will be described herein with reference to exemplary communication systems and associated processing devices. It is to be appreciated, however, that the invention is not restricted to use with the particular illustrative system and device configurations shown.

Accordingly, the term "communication system," as used herein, is intended to be broadly construed so as to encompass any type of system in which multiple processing devices can communicate with one another. Also, the term "cryptographic device," as used herein, is intended to be construed broadly so as encompass any type of processing device that incorporates cryptographic functionality (such as a computer, server, mobile device, radio-frequency identification (RFID) tag or reader, authentication token, etc.).

Additionally, the term "authentication server" should be understood to encompass any type of processing device or set of such devices that is operative to authenticate a passcode provided by an authentication token or other type of cryptographic device. As used herein, an "authentication server" need not be a network-based server, and may be implemented as a portion of a device that performs other functions, as a combination of multiple servers or other devices, or in other forms.

Also, the term "authentication information," as used herein, is intended to include passwords, passcodes, answers to life questions, or other authentication credentials, or values derived from such authentication credentials, or more generally any other information that a user may be required to submit in order to obtain access to an access-controlled application. Similarly, the term "passcode," as used herein, is intended to include authentication information such as one-time passcodes (OTPs), or more generally any other information that may be utilized for cryptographic authentication purposes.

Figure 1:
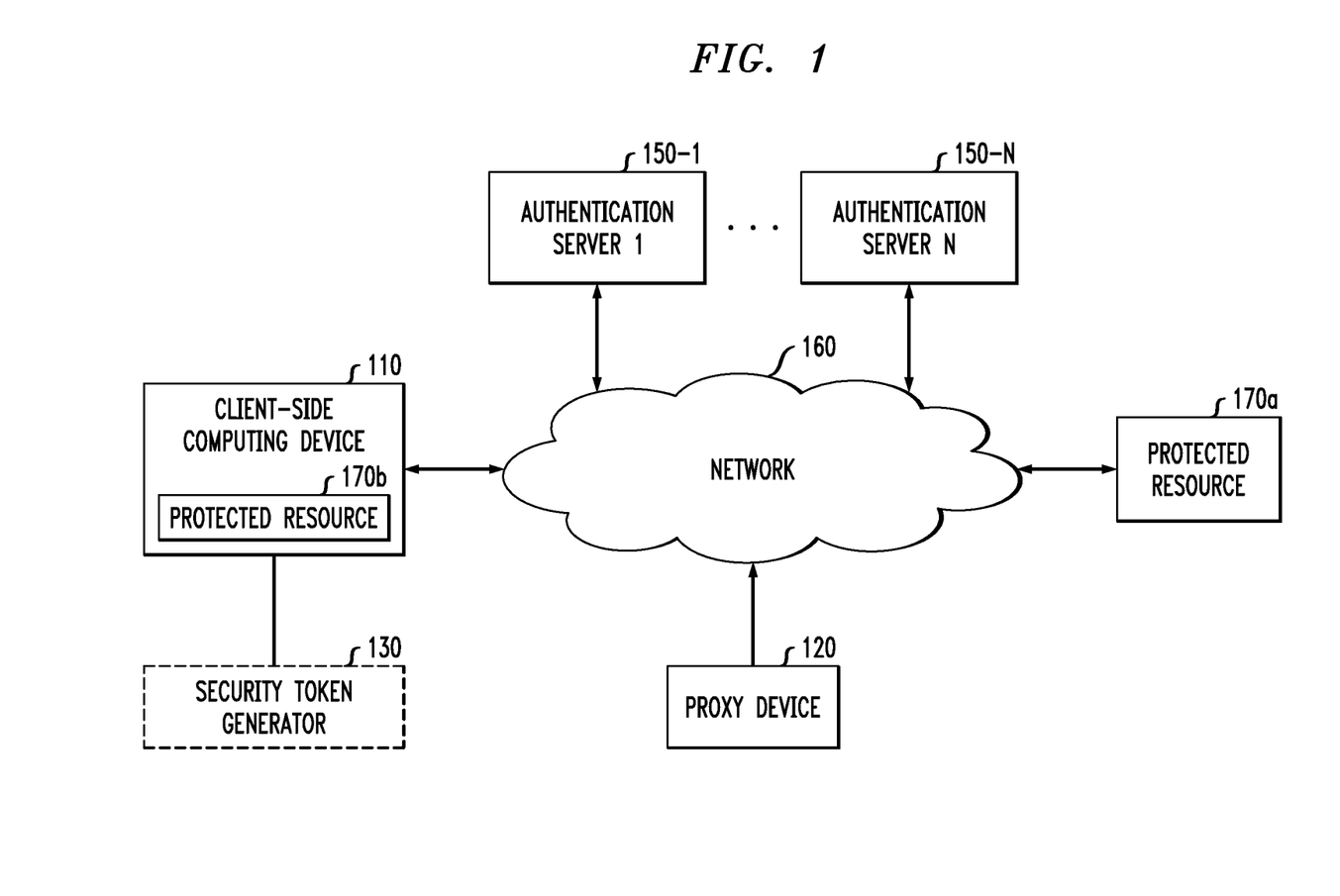
FIG. 1 is a diagram illustrating an example network environment in which one or more embodiments of the present invention can operate.

FIG. 1 illustrates an example client-side computing device (CSCD) 110 communicating with a protected resource 170a over a network 160. As detailed further below, at least one embodiment of the invention can also include a CSCD 110 that includes a protected resource 170b residing thereon. In an example implementation, a user must authenticate with one or a plurality of authentication servers 150-1 through 150-N (hereinafter, collectively referred to as authentication servers 150) using a token generated by a security token generator 130 (hereinafter, referred to as security token 130) before obtaining access to protected resource 170a and/or 170b (hereinafter, collectively referred to as protected resource 170 unless otherwise specified). Additionally, in accordance with one or more embodiments of the invention, a proxy device 120 can be utilized to communicate with CSCD 110 and authentication servers 150. In addition to the configuration depicted in FIG. 1, the proxy device 120 can also, in one or more embodiments of the invention, be deployed on the authentication server(s) 150 and/or on the network 160. The proxy device is described further herein, particularly as detailed in connection with FIG. 5.

As indicated above, in at least one example embodiment of the invention described herein, a CSCD 110 can include a mobile device such as a mobile phone, a smart phone, a tablet, etc. Additionally, as depicted in FIG. 1, the network 160, may comprise, for example, a global computer network such as the Internet, a wide area network (WAN), a local area network (LAN), a satellite network, a telephone or cable network, or various portions or combinations of these and other types of networks.

According to one aspect of the invention, as noted above, the user of the CSCD 110 is authenticated using a one-time passcode generated by the security token generator 130 by authentication servers 150. The exemplary communications among the system elements 110, 120, 130, 150 and 170 of FIG. 1 to achieve joint authentication by the authentication servers 150 is discussed further below.

It is to be appreciated that a given embodiment of the disclosed system may include multiple instances of CSCD 110, security token 130 and protected resource 170, and possibly other system components, although only single instances of such components are shown in the simplified system diagram of FIG. 1 for clarity of illustration.

Further, as used herein, the term "session" with a protected resource 170 shall mean an interactive information interchange between a CSCD 110 and the protected resource 170.

The security token 130 is shown in FIG. 1 as being separate from and electrically connected to the CSCD 110. The security token 130 may be implemented, for example, using the RSA SecurID® user authentication token commercially available from RSA Security Inc. of Bedford, Mass., U.S.A. The security token 130 may be a server or other type of module that is accessible over the network 160, or it may be a software component resident on the CSCD 110. As another alternative, security token 130 may be distributed over multiple devices, one of which may be the CSCD 110. Also, for example, the security token 130 can encompass a handheld device with no connection to the other noted components, or can encompass a software application running on the CSCD 110.

Accordingly, while at least one embodiment of the present invention is illustrated herein using a security token 130 electrically connected to the CSCD 110, such that the CSCD 110 can read a given token code (or another authentication value) directly from the token 130, other implementations are within the scope of the present invention (such as radio frequency (RF), infrared, etc.), as would be apparent to a person of ordinary skill in the art. By way of example, for security tokens 130 that are not connectable to a computer or other user device in this manner, the user may manually enter a password or another value displayed by the token 130 at the time of the attempted access.

As noted, the CSCD 110 may represent a portable device, such as a mobile telephone, personal digital assistant (PDA), wireless email device, game console, etc. The CSCD 110 may alternatively represent a desktop or laptop personal computer (PC), a microcomputer, a workstation, a mainframe computer, a wired telephone, a television set top box, or any other information processing device which can benefit from the use of authentication techniques in accordance with the invention.

The CSCD 110 may also be referred to herein as simply a "user." The term "user," as used in this context, should be understood to encompass, by way of example and without limitation, a user device, a person utilizing or otherwise associated with the device, or a combination of both. An operation described herein as being performed by a user may therefore, for example, be performed by a user device, a person utilizing or otherwise associated with the device, or by a combination of both the person and the device. Similarly, a password or other authentication information described as being associated with a user may, for example, be associated with a CSCD device 110, a person utilizing or otherwise associated with the device, or a combination of both the person and the device.

As also depicted in FIG. 1, the authentication servers 150 are typically associated with a third party entity, such as an authentication authority, that processes authentication requests on behalf of web servers and other resources, as well as verifies the authentication information that is presented by a CSCD 110.

Further, the protected resource 170 may be, for example, an access-controlled application, web site or hardware device. In other words, a protected resource 170 is a resource that grants user access responsive to an authentication process, as will be described in greater detail below. For example, protected resource 170a may include an access controlled file, e-mail, a protected application, a remote application server such as a web site or other software program or hardware device that is accessed by the CSCD 110 over a network 160.

Additionally, in at least one embodiment of the invention, protected resource 170b can include one or more applications or data residing on the CSCD 110 itself. For example, such a protected resource 170b can include access to a mobile data management container for launching applications on the CSCD 110 (such as a mobile device), which can be protected requiring a successful token-based authentication in order to run the application(s) protected by the container. Further, protected resource 170b could also include an access controlled file, e-mail, a protected application, a remote application server such as a web site or other software program or hardware device that is accessed by the CSCD 110 over a network 160. Similarly, it is possible that in order to unlock the mobile platform to perform operations, a successful authentication with the security token would be required.

As described herein, a verifier (that is, a device that authenticates a user for some purpose according to the methods described herein) can include a mobile device that is disconnected from an authentication server for a period of time. However, it should also be appreciated that a verifier can include any device that wishes to authenticate a user without necessarily connecting to the authentication server.

Figure 2:
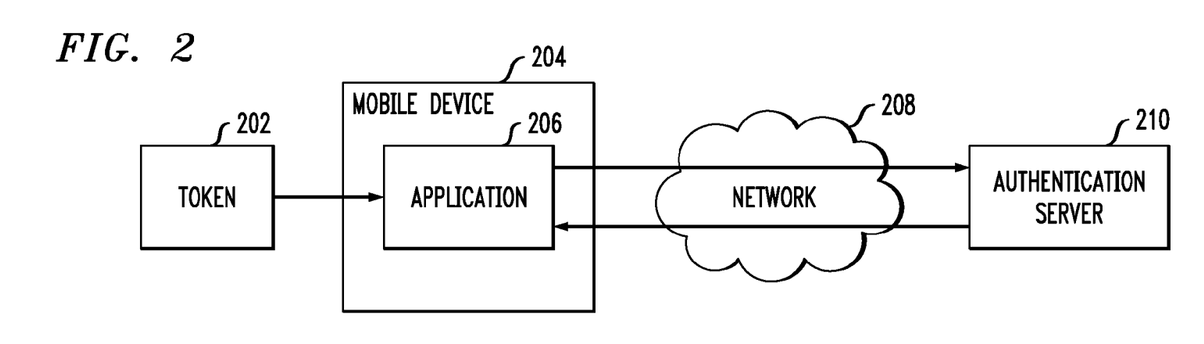
FIG. 2 is a diagram illustrating an example embodiment of the invention.

FIG. 2 is a diagram illustrating an example embodiment of the invention. By way of illustration, FIG. 2 depicts a token 202, a mobile device 204 with an application 206 residing thereon, a network 208 and an authentication server 210. In the example scenario depicted in FIG. 2, the mobile device 204 can connect in real-time to the authentication server 210 (via the network 208). In one example case, if the user (of the mobile device) wants to access the application 206 on the mobile platform, the application 206 will prompt the user for the necessary authentication information, including, for example, a code being displayed on the token 202. The user will enter authentication information (for example, a username) and the code into a prompt displayed by the application 206 on the mobile device 204. The application 206 will send the authentication information through the network 208 to the authentication server 210 for validation. If the validation is successful, the authentication server 210 will return a success code to the application 206 and grant the access requested by the user.

However, in certain situations, the mobile device 202 is offline and/or disconnected (for example, on an airplane) and cannot access the network 208 or the authentication server 210. Accordingly, FIG. 3 is a diagram illustrating an example embodiment of the invention.

Figure 3:
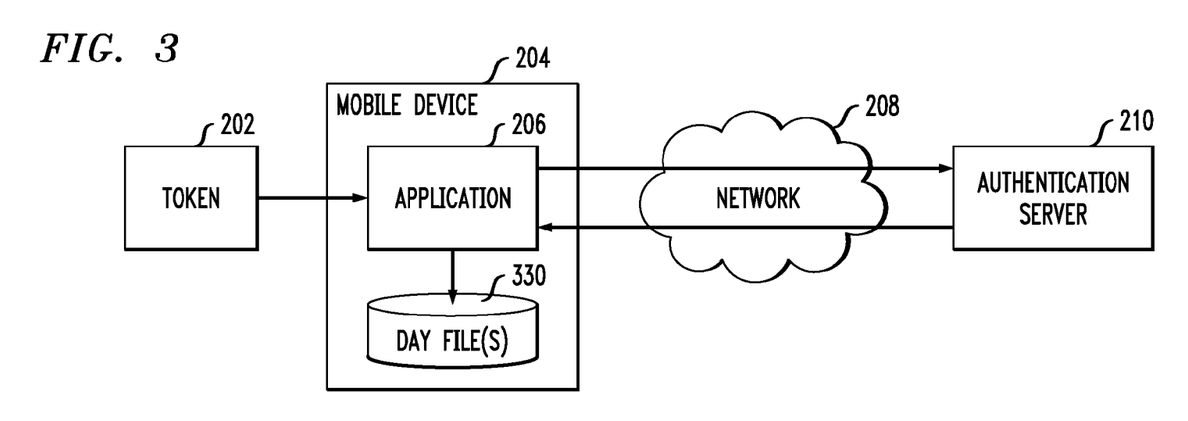
FIG. 3 is a diagram illustrating an example embodiment of the invention.

In this offline scenario, one or more embodiments of the invention include making certain preparations beforehand (that is, while the mobile device 204 is still connected to the authentication server 210), such as illustrated in FIG. 3. At a time before the mobile device 204 is disconnected from the network 208, while the mobile device 204 is still connected to the network 208, the application 206 communicates with the authentication server 210 to send the authentication server 210 a series of day files 330 (or one day file with many records).

As used herein, a "day file" is an illustrative term that refers to a side product of a token authentication process; namely, a "day file" refers to a support file holding an arbitrary number of elements depending upon the token type and any relevant policy. For example, the RSA SecurID® user authentication token is based on encrypting the current Greenwich Mean Time (GMT). Accordingly, it is known that every token will generate 1440 codes in a day (once a minute for 24 hours). In the case of SecurID® tokens, it is convenient to package every day's worth of 1440 hash values into a single file, and then create a new file for the next day. These files are referred to as day files because they store one day's worth of hash codes. As such, every day that passes, the mobile device will discard any old unneeded day files, and, if connected to the network/server, communicate with the server to obtain a new set of day files to top-up. That way, if the relevant policy is to have seven days worth of day files, the user can disconnect at any time, and his or her mobile device can perform the offline authentication for the next seven days.

However, as noted, the SecurID® token example is merely illustrative, and it should be appreciated that one or more embodiments of the invention can be implemented in situations wherein the mobile device specifically asks for a certain number of days of support, or where the server automatically pushes the day files based on a particular policy. Also, the term day file is, as noted, merely an illustrative term for the broader concept of a support file, and such a file need not be time-based. For example, tokens wherein a button is pushed to authenticate each time a code is needed do not have a fixed number of codes which are generated each day (yet they would still utilize a "day file" or support file).

Referring back to FIG. 3, the application 206 will prompt the user for the normal authentication information, including the token code 202. This can occur, for example, transparently during a normal authentication by the user of the mobile device 204 into the application 206. Once the user has been authenticated by the authentication server 210, the authentication server 210 can send to the application 206 the needed amount of day files 330. These day files 330 are stored on the mobile device 204 by the application 206. Note that policy considerations can control the number of days that the mobile device 204 can be disconnected, and hence the size of the day files storage 330. Also, if this is the first time that the day file will be created on the mobile device 204, the entire set of day files will be sent by the authentication server 210. Additionally, in accordance with at least one embodiment of the invention, the process creating the day files, the process sending the day files, and the authentication server can be separate related processes which reside on the same or different systems, all on one system, or some combination thereof.

Note that the day files 330 can be created using the cryptographic function shown in FIG. 6 and described in detail below.

Figure 4:
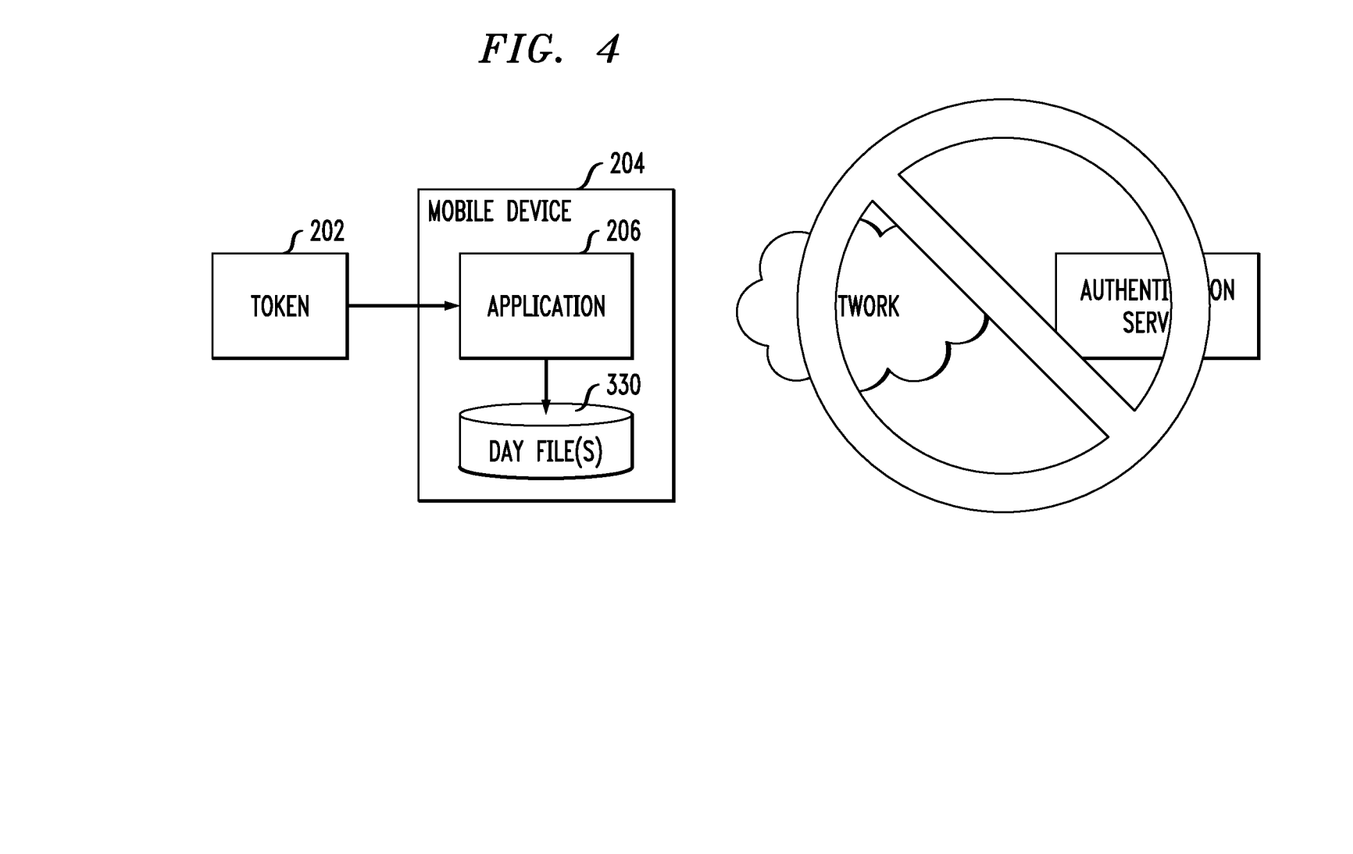
FIG. 4 is a diagram illustrating an example embodiment of the invention.

FIG. 4 is a diagram illustrating an example embodiment of the invention. Specifically, FIG. 4 depicts an extension of the above-noted examples in FIGS. 2-3, wherein the user (mobile device 204) is disconnected from the network 208 and authentication server 210. By way of illustration, assume that while offline, the user wants to authenticate to the protected application 206. Also, for example, at least one embodiment of the invention can be implemented in a scenario wherein the mobile device 204 is connected to the network 208 but cannot access the authentication server 210. Further, at least one embodiment of the invention can be implemented in a scenario wherein the mobile device 204 can communicate with both the network 208 and the authentication server 210, however, by policy or some other means, the application 206 authenticates locally to the day files rather than to the authentication server 210. One reason behind the existence of such a scenario might include an objective to reduce the load on the central authentication server or to reduce possibly costly network traffic. Additionally, at least one embodiment of the invention can be implemented in a scenario wherein local day file authentication for low-risk applications is permitted, but a requirement exists directing high-risk applications (for example, a banking application) to go to the remote authentication server.

As noted above, there is no connectivity to the network 208 or to the authentication server 210 in this instance. As a result, the application 206 will prompt the user for the authentication credentials as usual, and the application 206 will perform the cryptographic function detailed in FIG. 7, in conjunction with the day file(s) 330 previously provided by the authentication server 210, to unlock the application.

Also, it should be noted that FIGS. 2-4 herein illustrate embodiments of the invention implemented to protect a single application, but one skilled in the art would appreciate that a service can run in the mobile device which any number of applications could leverage. Similarly, such a service could be used to unlock a mobile device management (MDM) platform or other application launchers such that a single token code could enable an entire set of applications. Further, the techniques detailed herein can also be used to unlock an entire mobile platform when used with a log-in screen.

Additionally, the above-described example noted that successful offline authentication yielding an unlock-code, but it should be noted and appreciated by one skilled in the art that this value could be a variety of values such as, for example, a password, a personal identification number (PIN), or even another key used to unlock a variety of items.

Figure 5:
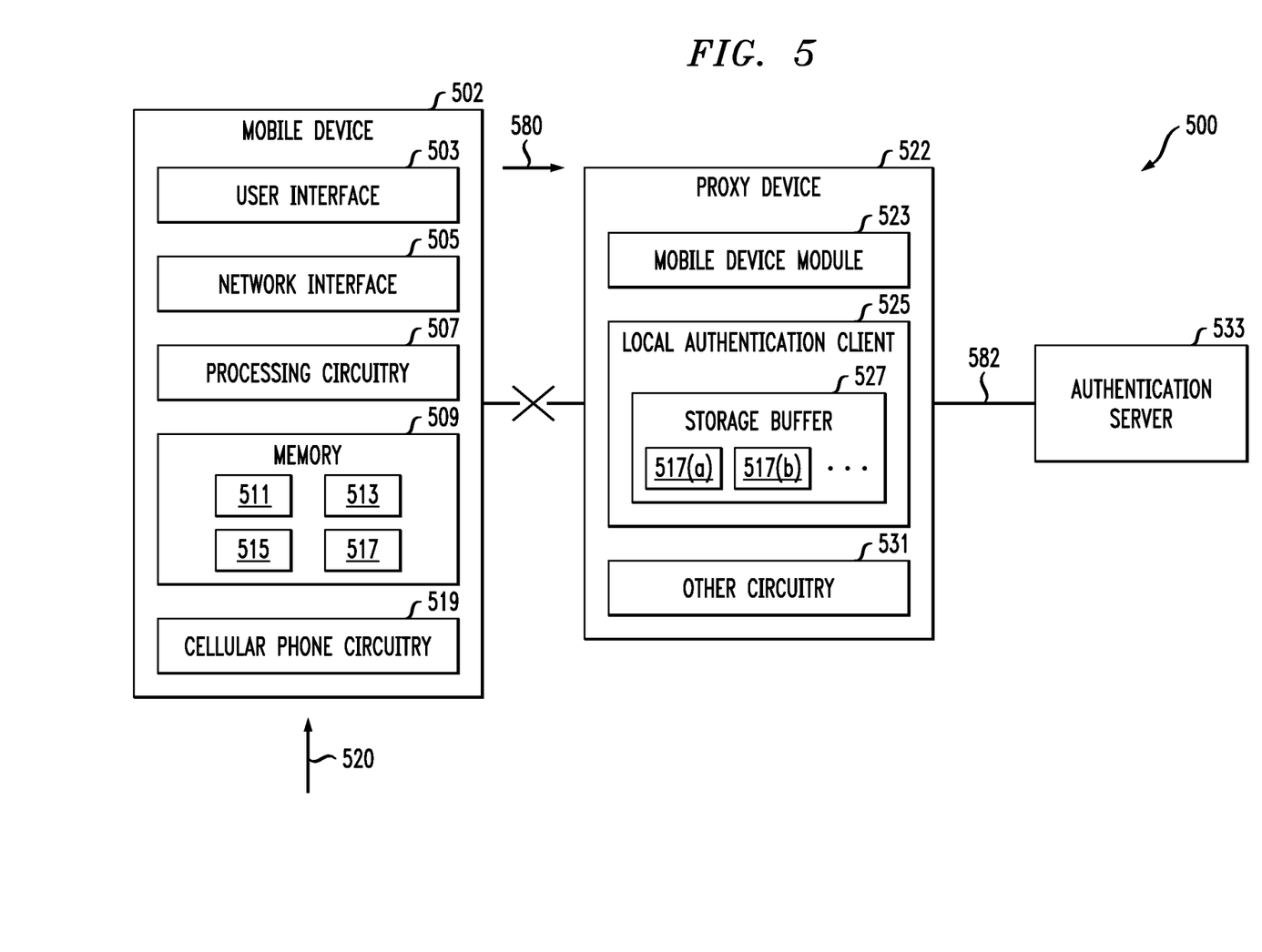
FIG. 5 is a flow diagram illustrating techniques according to an embodiment of the invention.

FIG. 5 is a block diagram illustrating an example embodiment of the invention. By way of illustration, FIG. 5 depicts details of components of an example electronic environment 500 involved in authentication-related activities in accordance with at least one embodiment of the invention. As illustrated, a mobile device 502 includes a user interface 503, a network interface 505, processing circuitry 507, memory 509, and cellular phone circuitry 519. The mobile device 502 can additionally include housing (not illustrated) to serve as protection for the identified components.

As additionally depicted in FIG. 5, a proxy device 522 includes a mobile device module 523 and a local authentication client module 525 which are linked together, as well as other circuitry 531 such as equipment for a third party server (for example, a web server, a database server, protected computerized resources, and/or infrastructure hardware). The local authentication client module 525 includes a storage buffer 527 which enables the proxy device 522 to buffer OTP files 517(a), 517(b), and so on from authentication server 533 for distribution to mobile devices such as device 502 when the mobile devices come online from the perspective of the proxy device 522. In addition to the configuration depicted in FIG. 5, the proxy device 522 can also, in one or more embodiments of the invention, be deployed on the authentication server 533 and/or on an associated network.

Referring again to FIG. 5, the network interface 505 of the mobile device 502 is configured to connect the mobile device 502 to a communications medium such as, for example, Wi-Fi and/or cellular telephony. Accordingly, the network interface 505 enables the mobile device 502 to communicate with the other components of the electronic environment 500, including the proxy device 522. Additionally, the user interface 503 is configured to receive user input and provide user output. One or more embodiments of the invention can include components such as a display screen, a capacitive touch display, and a push-button keyboard implemented for use in connection with the user interface 503.

The memory 509 of the mobile device 502 is configured to store one or more software constructs including, for example, an operating system 511, an authentication application 513, data for protected computerized resources 515 (documents, restricted applications, etc.), OTP files 517, as well as other suitable or relevant material. Further, the processing circuitry 507 is configured to operate in accordance with the software constructs stored in the memory 509. By way of example, when the processing circuitry 507 runs the operating system 511, the processing circuitry 507 provides a secure electronic platform on which a user is able to carry out work. Such an electronic platform is capable of operating as a container to protect data and requiring user authentication before permitting access. Further, when the processing circuitry 507 runs the authentication application 513, the processing circuitry 507 communicates with the proxy device 522 in a secure manner, for example, to obtain an OTP file 517. It should be appreciated that the processing circuitry 507 can include one or more processors running specialized software, such as detailed in connection with the techniques described herein. Additionally, the proxy device 522 can also be implemented using processing circuitry capable of operating in accordance with an application delivered via a computer program product, such as generally described herein.

Additionally, as depicted in FIG. 5, the cellular phone circuitry 519 allows the user to establish cellular phone calls with other callers having remote devices, as would be appreciated by one skilled in the art. Further, while in many scenarios the components depicted in FIG. 5 are able communicate with each other, it should be noted that there may be instances wherein a communications channel (such as 582) is not available, and thus, one or more of the components will temporarily exist in an offline state. By way of example, the mobile device 502 may enter a geographical location that does not have a sufficient wireless network, or the authentication server 533 may become unavailable during a hardware failure or a loss of network access. However, as depicted in FIG. 5 (and described herein), once the mobile device 502 is able to obtain a valid OTP file 517, the user of the mobile device 502 is able to perform local user authentication to access protected resources even if the mobile device 502 is in an offline state.

Accordingly, FIG. 5 depicts the mobile device 502 in an offline state where no communications channel exists to the proxy device 522. The mobile device 502, however, is provisioned with the authentication application 513 and the OTP file 517 holding expected OTPs (as described above, for example). The mobile device 502, as seen in FIG. 5, can send a signal 580 to the proxy device 522, but such signal 580 fails to successfully contact the proxy device 522. As noted above, reasons for the lack of connection might include difficulty reaching a cell tower, being out of range of a wireless network, etc.

Consequently, the processing circuitry 507 of the mobile device 522 performs a local authentication operation using the OTP file 517 stored in the memory 509. In at least one embodiment of the invention, for example, the processing circuitry 507 runs the authentication application 513 (also stored in the memory 509), which directs the user of the mobile device 502 to enter an OTP 520 via the user interface 503. In response to the input of the OTP 520, the authentication application 513 compares the user-provided OTP 520 with one or more appropriate expected OTPs in the OTP file 517 (which is also stored in the memory 509).

Additionally, in at least one embodiment of the invention, the processing circuitry 507 also obtains a current time value and identifies, from the OTP file 517, certain time-indexed OTPs corresponding to windows of time covering the current time value. The processing circuitry 507 also compares the user-provided OTP 520 to each time-indexed OTP of the particular time-indexed OTPs from the OTP file 517 to determine whether user authentication is successful. If a match is determined in this comparison, the authentication application 513 deems the user to have successfully authenticated in an offline manner. Subsequently, the authentication application 513 permits the user to access the protected computerized resource 515 that is also stored in the memory 509.

Further, in at least one embodiment of the invention, the authentication application 513 caches the result of the authentication process detailed above, and transmits said result to the authentication server 533 via the proxy device 522 when the mobile device 502 returns to an online state.

Additionally, one or more embodiments of the invention include enabling the proxy device 522 to reformat and add content to authentication files. At least one embodiment of the invention can also include running an initial cryptography activity on the mobile device 502 to establish central processing unit (CPU) strength to determine the correct pepper to use in sending an analysis to an authentication server, as well as to use when files are generated for download. A policy can also be added on top of that cryptography analysis indicating that a particular file be wiped off the device, or not loaded to the device based on the strength of the system.

At least one embodiment of the invention includes assessing the CPU strength at every given time interval based on a password, and sending this assessed CPU strength to the server. Also, every corresponding authentication time can be collected and sent to the server as well. Additionally, at least one embodiment of the invention includes creating a list of devices along with each device's corresponding pepper strength, and sending this list to a policy server as assurance levels. Based on the list, the policy server can decide which files can go (that is, are permitted to reside) on a device, or if an MDM is needed to flush the files.

Additionally, at least one embodiment of the invention can also include removing a salt value (as described further herein) from the device remotely, forcing the user to successfully authenticate to get a new salt value on the device to access certain files. Further, the feedback of a crypto-analysis used to guess a pepper value (as also further described herein) can be utilized as feedback to the system to increase key size and strength.

Referring back to FIG. 5, at least one embodiment of the invention includes the mobile device 502 (via, for example a mobile application installed thereon) sending a passcode to a listener component of the mobile device module 523 on the proxy device 522. The listener component of the mobile device module 523 sends the pass code to the local authentication client 525, which interacts with the authentication server 533 to authenticate the passcode and download the corresponding day files. The local authentication client 525 then returns an authentication decision to the listener component of the mobile device module 523. The proxy device 522 reads and decrypts the day files, and subsequently returns the authentication decision and the decrypted day files to the mobile device 502.

Figure 6:
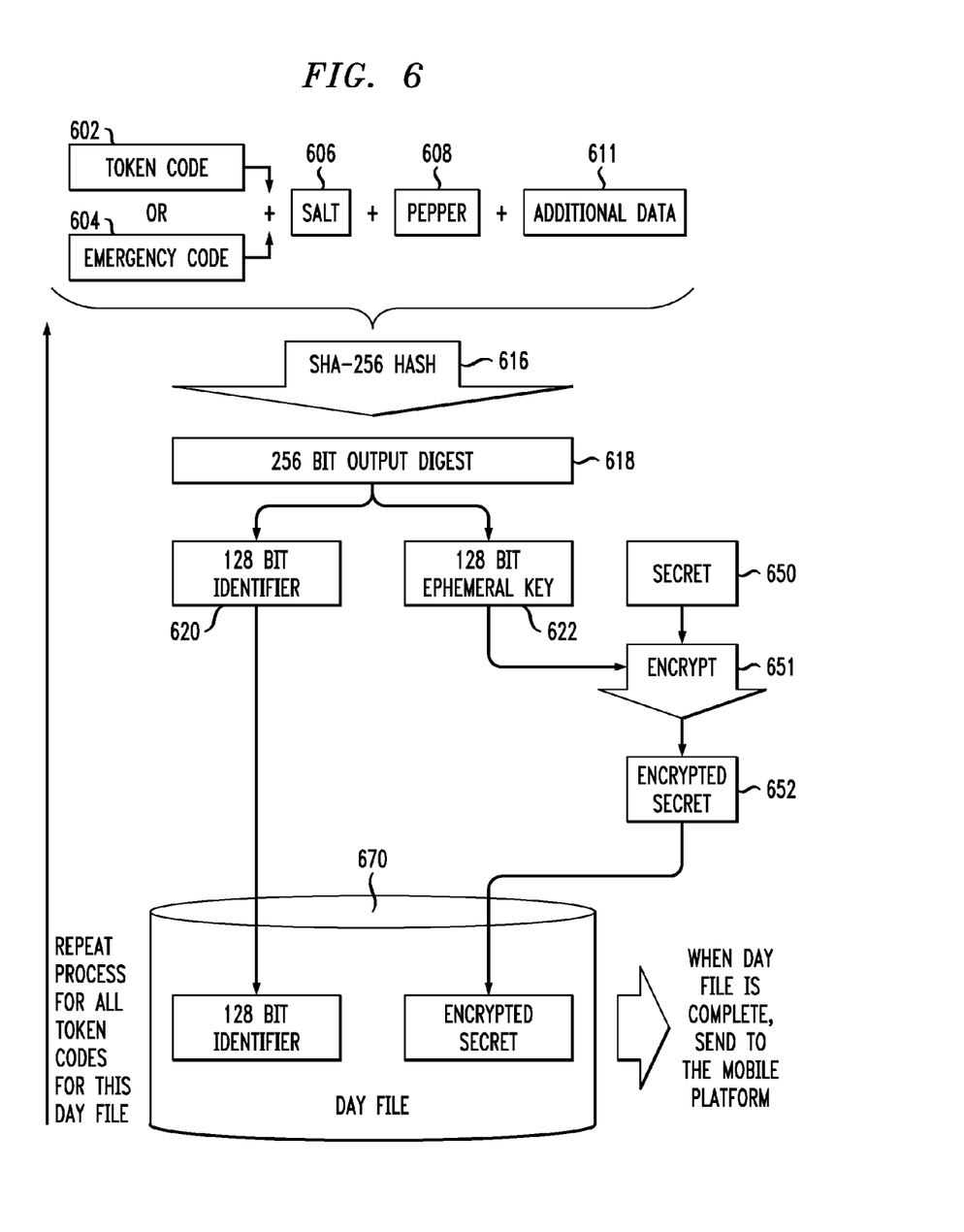
FIG. 6 is a block diagram illustrating an example embodiment of the invention.

As also detailed above in connection with FIGS. 2-3, FIG. 6 is a flow diagram illustrating techniques carried out by an authentication server according to an embodiment of the invention. The cryptographic function depicted in FIG. 6 shows that for every possible token code 602 (or for every emergency access code 604), a SHA-256 hash 616 is created by hashing the token code 602 together with a salt value 606, a pepper value 608, and any additional (or required) data 611.

In accordance with at least one embodiment of the invention, an emergency access code 604 can include passwords and/or numeric codes which the administrator can provide to a user over the phone if the user, for example, loses his or her token while disconnected. Emergency access codes 604 function similarly to passcodes 602, although there can be a limited number of emergency access codes 604 (for example, one per day file, which would only be useful for one day). This allows access to the application in an emergency situation, but would require the user to obtain this code from the administrator out of band—such as via a phone call.

Also, a salt value includes a random number which will be known to both the generator of the day file and the validator (the entity checking for a correct token code when offline). Salt is used to make each instance of the day file unique. A pepper value includes another random number generated by the system creating the day files, but the pepper value is unknown to the validator (as further described in conjunction with FIG. 7). Pepper is used, for example, to make cracking the day files more laborious for an attacker. Because the pepper value is unknown to the validator, the validator will need to perform a brute force attack to crack the pepper value during the authentication of a token code when offline. Additionally, the length of the pepper value can vary depending upon the processing capability of the mobile platform.

As also illustrated in FIG. 6, after the SHA-256 is run across the token code 602, salt 606, and pepper 608 (plus any additional data 611), the resulting 256-bit hash digest 618 is split into two parts. The two parts need not be of equal size, but in the illustrative example depicted in FIG. 6, one part is a 128-bit value 620 used as an identifier (corresponding to the token code used as input) and is stored in the day file 670. The other part of the hash digest is used as a 128-bit encrypt-key 622 that will be used to encrypt a secret 650. The secret 650 can encompass a key, an activation code, a password, etc., such as a component used or required to access data or an application on a mobile platform.

After the encrypt-key 622 is used to encrypt (via step 651) the secret 650—creating an encrypted secret 652—the encrypt-key 622 is destroyed (or simply not re-used), and the encrypted secret 652 is stored in the day file 670 and associated with the identifier 620. Accordingly, no clear text token codes exist, the encrypt-key 622 is ephemeral and destroyed once it is used (or simply not re-used), and the secret 650 is not stored in the clear, but stored in an encrypted form 652.

The process depicted in FIG. 6 is repeated for all token codes for a relevant time period, according to a controlling policy. Specifically, for every token registered in a system, the server knows the seed or internal key used to generate the token codes displayed on the token. By way of example, in pre-generating the day files, a server process can increment the GMT one minute, compute the passcode which would be displayed at that minute on the user's token, compute the data for the day file, and then increment to the next minute. Similarly, if the token is a counter based token, the server will know the seed and the counter value of the last successful authentication, and the server will step through all necessary counter values and compute the necessary token codes which correspond to those counter values even though they have not been used yet.

Also, at least one embodiment of the invention can include implementation with challenge-response tokens as follows. The server will pre-compute a set of random challenges as well as the expected responses which would be computed by the token when presented with those challenges. The responses would be treated in the same manner as the token code 602 in terms of the cryptographic operation shown in FIG. 6. The challenges would be carried as an additional element in the day file associated with the relevant identifier. On the validator side (see, for example, FIG. 7), when an authentication is needed, the challenge value would be read from the next available element in the day file and presented to the user. The user would enter the challenge into his or her token, and the response would be treated in the same manner as the token code 702 in the process illustrated in FIG. 7.

Additionally, the example embodiment of the invention depicted in FIG. 6 shows the cryptographic operation 616 as a SHA-256 bit hash and the output 618 as a digest, but it should be appreciated that other cryptographic operations (such as other hashes or encryptions) can be utilized. Also, the output of the example embodiment depicted in FIG. 6 is 256 bits, but it is to be appreciated that other cryptographic operations may produce other output lengths.

Figure 7:
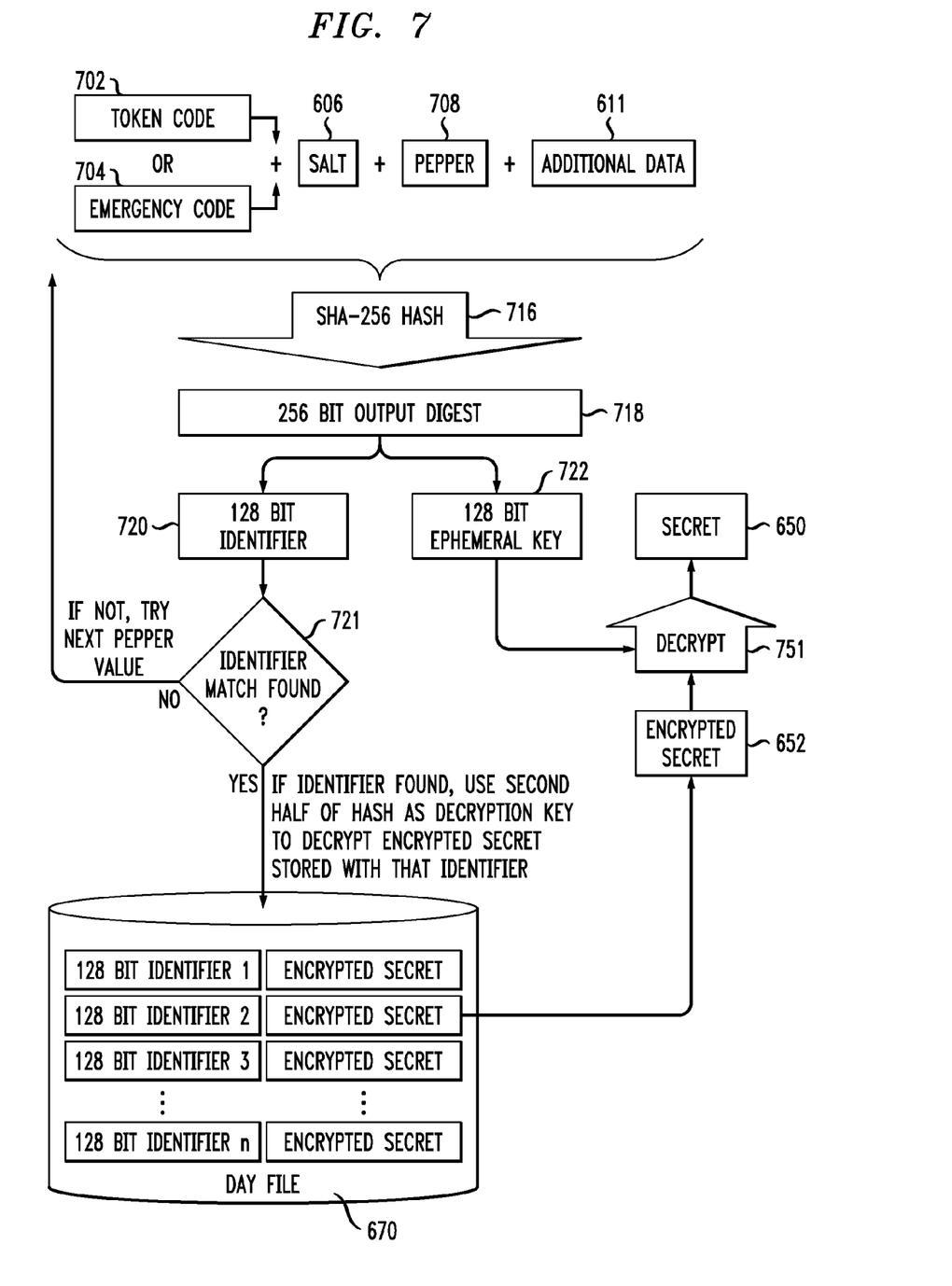
FIG. 7 is a block diagram illustrating an example embodiment of the invention.

As also detailed above in connection with FIG. 4, FIG. 7 is a block diagram illustrating techniques carried out by a client-side device (such as a user mobile device) according to an embodiment of the invention. As noted above, prior to the execution of the steps depicted in FIG. 7, the day file(s) 670 are loaded into the mobile device by the authentication server. In at least one embodiment of the invention, the server sends the day file(s) 670 to the mobile device upon full completion of the techniques depicted in FIG. 6 (that is, when all token codes have been processed). Also, in one or more embodiments of the invention, the server can send the day file(s) 670 to the mobile device in stages and/or portions.

Accordingly, as illustrated in FIG. 7, a token code 702 (or emergency code 704) entered by the user (the token code 602 having been displayed on his/her token) is combined with a known salt value 606, an estimated (unknown) pepper value 708, and any additional data 611. The additional data 611 is the same data used by the server in FIG. 6, and is known by the mobile device. For example, the data can be stored separately from the day file (such as in a registry, etc.). Additionally, such additional data 611 might include, for example, a phone's International Mobile Equipment Identity (IMEI) number, a cell phone number, a user ID, etc.

Referring back to FIG. 7, the combination of the token code 702, salt value 606, estimated pepper value 708, and additional data 611 is used as input for a SHA-256 hash function 716 (or other cryptographic operation), which produces a 256-bit output hash digest 718. This output is partitioned into two components: a (128-bit) component 720 that identifies the token code 702 received from the user, and an ephemeral (128-bit) key 722.

Step 721 includes determining whether the identifier component 720 matches any of the identifiers stored in the day file 670. As noted above, the day file 670 is provided to the mobile device subsequent to the techniques carried out in FIG. 6. This transfer of the day file can be carried out in a variety of ways, such as, for example, an on-demand mechanism, an automated mechanism, a policy-driven mechanism, a push from the server, a pull from the mobile device, etc. If no match exists (via step 721), it is assumed that an incorrect pepper value estimate was used in the hash function, and the techniques depicted in FIG. 7 are started anew with a different pepper value.

In connection with the pepper value, on the server side, the pepper value is randomly generated. The client side, however, estimates or guesses the pepper value. By way merely of example, the mobile device can begin at zero and step through the pepper values one at a time, incrementing one per pass, for each token code entered. Either the mobile device will eventually find the correct pepper value, in which case the authentication will proceed successfully, or the mobile device will run out of pepper values, in which case the token code was incorrect and the authentication will fail. Further, in at least one embodiment of the invention, because of time drifting on the mobile device while disconnected, the application can also accept a match within some reasonable and/or pre-determined time window (for example, five minutes) rather than accepting only the match for the identifier associated with the precise minute the token code was entered.

Referring back step 721 in FIG. 7, if there is a match between the identifier component 720 and an identifier stored in the day file 670, the encrypted secret 652 stored in the day file 670 that corresponds with this matched identifier is extracted and provided to the mobile device. The ephemeral key 722 is then used in step 751 to decrypt this encrypted secret 652, providing access to the secret 650. The ephemeral key 722 is then destroyed (or simply not re-used).

FIG. 6 and FIG. 7 illustrate an example embodiment of the invention which includes pepper, salt and additional data values. These values are included to make the day files more difficult for an attacker to crack or access. It should be appreciated by one skilled in the art that one or more embodiments of the invention can be implemented without one or more of these noted values.

Figure 8:
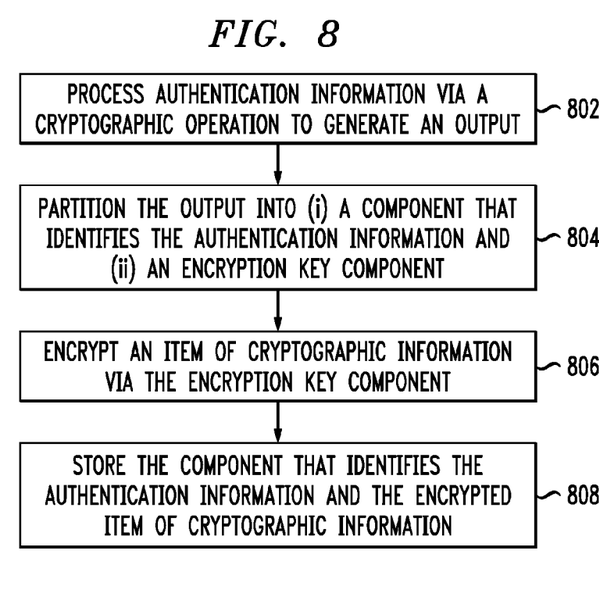
FIG. 8 is a flow diagram illustrating techniques according to an embodiment of the present invention.

FIG. 8 is a flow diagram illustrating techniques according to an embodiment of the present invention. Step 802 includes processing authentication information via a cryptographic operation to generate an output. The authentication information, as described herein can include, for example, a token code or an emergency code, as well as a salt value, a pepper value, and one or more items of additional data.

At least one embodiment of the invention can also include computing strength of a user device associated with the authentication information, determining a size of the pepper value based on the computed strength of the user device, and creating a policy associated with the pepper value, wherein said policy defines content permitted on the user device. Additionally, one or more embodiments of the invention can further include creating a list of multiple entries, wherein each entry comprises, for one of multiple user devices, a user device identifier and the pepper value corresponding to the user device, and providing the list to a policy server, wherein each of the multiple entries represents an assurance level for the corresponding user device.

Step 804 includes partitioning the output into (i) a component that identifies the authentication information and (ii) an encryption key component. Step 806 includes encrypting an item of cryptographic information via the encryption key component. As described herein, the cryptographic information can include a key, an activation code, a password, etc. Step 808 includes storing the component that identifies the authentication information and the encrypted item of cryptographic information.

The techniques depicted in FIG. 8 can also include destroying the encryption key component subsequent to encrypting the item of cryptographic information via the encryption key component. Alternatively, in at least one embodiment of the invention, in lieu of destroying the encryption key, the encryption key is simply not re-used. Additionally, at least one embodiment of the invention includes repeating said processing, partitioning, encrypting and storing steps for each of one or more items of authentication information associated with a user device (for example, repeating said processing, partitioning, encrypting and storing steps for each token code that can be displayed by a user token).

Also, the techniques depicted in FIG. 8 can also include providing the stored component that identifies the authentication information and the stored encrypted item of cryptographic information to a device (for example a user mobile device).

Figure 9:
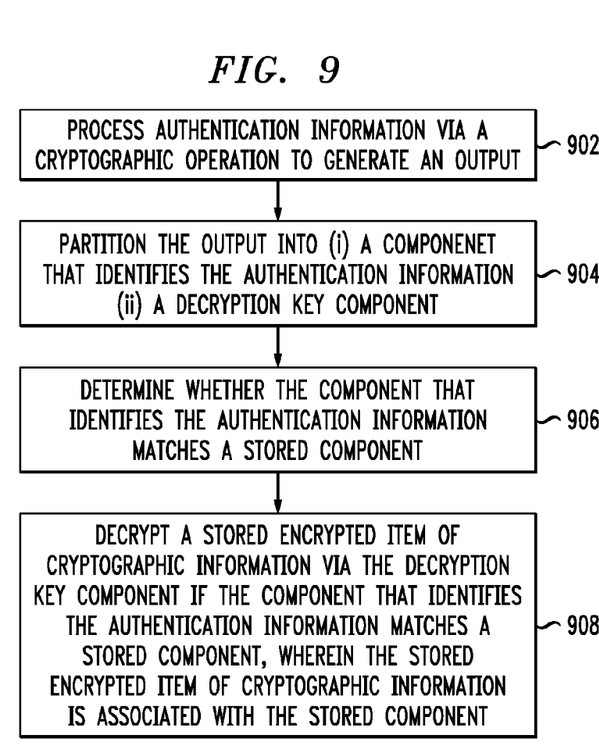
FIG. 9 is a flow diagram illustrating techniques according to an embodiment of the present invention.

FIG. 9 is a flow diagram illustrating techniques according to an embodiment of the present invention. Step 902 includes processing authentication information via a cryptographic operation to generate an output. In at least one embodiment of the invention, the authentication information item (a token code or an emergency code) can also be combined with at least one of a salt value, a pepper value, and one or more additional data items. Step 904 includes partitioning the output into (i) a component that identifies the authentication information and (ii) a decryption key component. Step 906 includes determining whether the component that identifies the authentication information matches a stored component.

Step 908 includes decrypting a stored encrypted item of cryptographic information via the decryption key component if the component that identifies the authentication information matches a stored component, wherein the stored encrypted item of cryptographic information is associated with the stored component. The stored item of cryptographic information can include a key, an activation code, a password, etc.

The techniques depicted in FIG. 9 can also include destroying the decryption key component subsequent to decrypting the stored encrypted item of cryptographic information via the decryption key component. Alternatively, in at least one embodiment of the invention, in lieu of destroying the decryption key, the decryption key is simply not re-used. Additionally, at least one embodiment of the invention includes processing different authentication information via a cryptographic operation if the component that identifies the authentication information does not match a stored component.

In at least one embodiment of the invention, the decrypted item of cryptographic information enables a mobile device full access to a protected resource. Additionally, in at least one embodiment of the invention, the decrypted item of cryptographic information enables a mobile device partial access to a protected resource.

Authentication techniques of the type described herein may be implemented in a wide variety of different applications. An additional exemplary communication system application that may incorporate such techniques will now be described with reference to FIG. 10.

Figure 10:
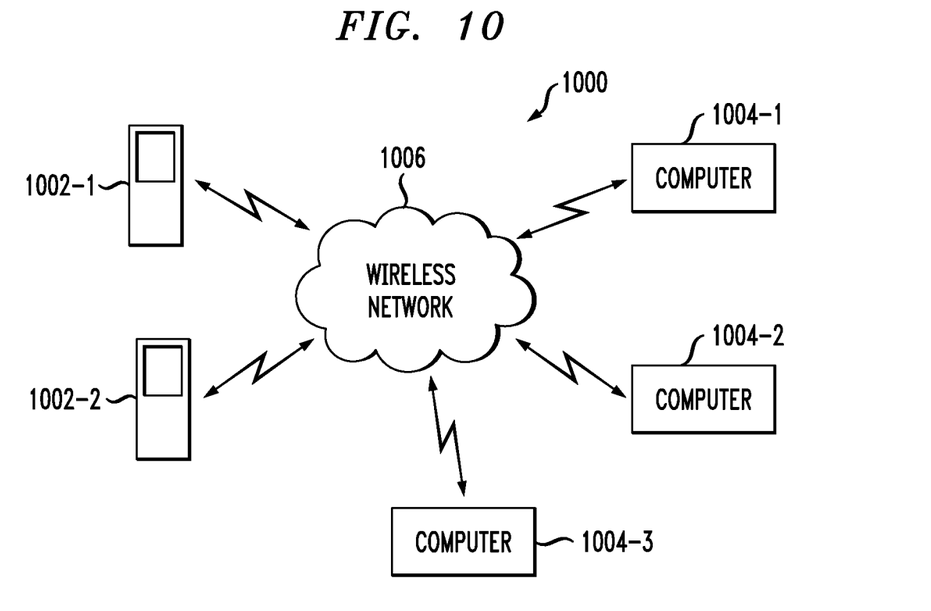
FIG. 10 shows an example embodiment of a communication system that may incorporate at least one embodiment of the invention.

Referring to FIG. 10, a communication system 1000 comprises a plurality of mobile telephones 1002-1 and 1002-2 and computers 1004-1, 1004-2 and 1004-3, configured to communicate with one another over a network 1006.

Any two or more of the devices 1002 and 1004 may correspond to cryptographic devices configured to implement at least one embodiment of the invention, as previously described. It is to be appreciated that the techniques disclosed herein can be implemented in numerous other applications.

Figure 11:
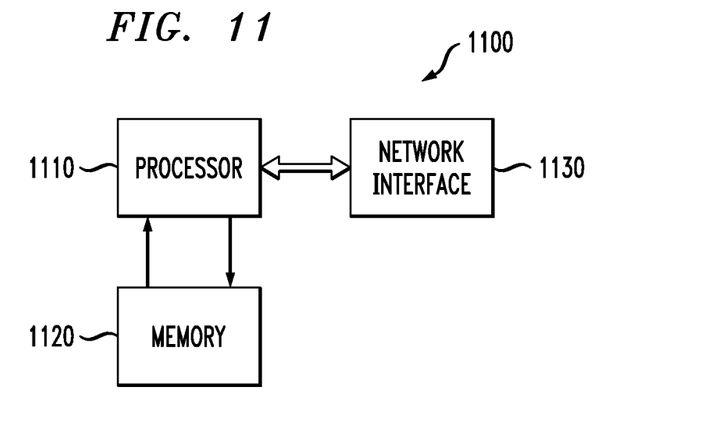
FIG. 11 illustrates one possible implementation of a given client-side computing device, authentication authority, protected resource or another processing device detailed in conjunction with at least one embodiment of the invention.

FIG. 11 illustrates one possible implementation of a given client-side computing device, authentication authority, proxy device, protected resource or another processing device of the example network environment of FIG. 1. The processing device 1100 in this implementation includes a processor 1110 coupled to a memory 1120 and a network interface 1130. These device elements may be implemented in whole or in part as a conventional microprocessor, digital signal processor, application-specific integrated circuit (ASIC) or other type of circuitry, as well as portions or combinations of such circuitry elements. As will be appreciated by those skilled in the art, portions of an authentication technique in accordance with an embodiment of the invention can be implemented at least in part in the form of one or more software programs that are stored in memory 1120 and executed by the corresponding processor 1110. The memory 1120 is also used for storing information used to perform computations or other operations associated with the disclosed authentication on techniques.

Aspects of the present invention are described herein with reference to flowchart illustrations and/or block diagrams of methods, apparatus (systems) and computer program products according to embodiments of the invention. It is to be appreciated that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As further described herein, such computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, as further detailed below, at least one embodiment of the invention includes an article of manufacture tangibly embodying computer readable instructions which, when implemented, cause a computer to carry out techniques described herein.

The computer program instructions may also be loaded onto a computer or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should be noted that the functions noted in the block may occur out of the order noted in the figures.

Accordingly, the techniques described herein can include providing a system, wherein the system includes distinct software modules, each being embodied on a tangible computer-readable recordable storage medium (for example, all modules embodied on the same medium, or each modules embodied on a different medium). The modules can run, for example, on a hardware processor, and the techniques detailed herein can be carried out using the distinct software modules of the system executing on a hardware processor.

Additionally, the techniques detailed herein can also be implemented via a computer program product that includes computer useable program code stored in a computer readable storage medium in a data processing system, wherein the computer useable program code was downloaded over a network from a remote data processing system. The computer program product can also include, for example, computer useable program code that is stored in a computer readable storage medium in a server data processing system, wherein the computer useable program code is downloaded over a network to a remote data processing system for use in a computer readable storage medium with the remote system.

As will be appreciated by one skilled in the art, aspects of the present invention may take the form of an entirely hardware embodiment, an entirely software embodiment (including firmware, resident software, micro-code, etc.) or an embodiment combining software and hardware aspects that may all generally be referred to herein as a "module" or "system."

An aspect of the invention or elements thereof can be implemented in the form of an apparatus including a memory and at least one processor that is coupled to the memory and operative to perform the techniques detailed herein. Also, as described herein, aspects of the present invention may take the form of a computer program product embodied in a computer readable medium having computer readable program code embodied thereon.

As will be appreciated, any combination of computer readable media may be utilized. The computer readable medium can include a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Examples include an electrical connection having one or more wires, a portable computer diskette, a hard disk, a random access memory (RAM), a read-only memory (ROM), an erasable programmable read-only memory (EPROM), Flash memory, an optical fiber, a portable compact disc read-only memory (CD-ROM), an optical storage device, a magnetic storage device, and/or any suitable combination of the foregoing. More generally, a computer readable storage medium may be any tangible medium that can contain, or store a program for use by or in connection with an instruction execution system, apparatus, or device.

Additionally, a computer readable signal medium may include a propagated data signal with computer readable program code embodied therein, for example, in baseband or as part of a carrier wave. Such a propagated signal may take any of a variety of forms such as, for example, electro-magnetic, optical, or a suitable combination thereof. More generally, a computer readable signal medium may be any computer readable medium that is not a computer readable storage medium and that can communicate, propagate, or transport a program for use by or in connection with an instruction execution system, apparatus, or device.

Program code embodied on a computer readable medium can be transmitted using an appropriate medium such as, for example, wireless, wireline, optical fiber cable, RF, and/or a suitable combination of the foregoing. Computer program code for carrying out operations in accordance with one or more embodiments of the invention can be written in any combination of at least one programming language, including an object oriented programming language, and conventional procedural programming languages. The program code may execute entirely on a user's computer, partly on a user's computer, as a stand-alone software package, partly on a users computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In light of the above descriptions, it should be understood that the components illustrated herein can be implemented in various forms of hardware, software, or combinations thereof, for example, application specific integrated circuit(s) (ASICS), functional circuitry, an appropriately programmed general purpose digital computer with associated memory, etc.

Terminology used herein is for the purpose of describing particular embodiments only and is not intended to be limiting of the invention. For example, the singular forms "a," "an" and "the" are intended to include the plural forms as well, unless clearly indicated otherwise. It will be further understood that the terms "comprises" and/or "comprising," as used herein, specify the presence of stated features, integers, steps, operations, elements, and/or components, but do not preclude the presence or addition of another feature, integer, step, operation, element, component, and/or group thereof. Additionally, the corresponding structures, materials, acts, and equivalents of all means or step plus function elements in the claims are intended to include any structure, material, or act for performing the function in combination with other claimed elements as specifically claimed.

It should again be emphasized that the above-described embodiments of the invention are presented for purposes of illustration only. Many variations and other alternative embodiments may be used. For example, the techniques are applicable to a wide variety of other types of communication systems and cryptographic devices that can benefit from using token code to protect data contained in a mobile container. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method comprising:
processing authentication information generated by a server via a cryptographic operation to generate an output, wherein said processing comprises combining the authentication information with (i) a salt value and (ii) a pepper value based on a computed strength of a user device associated with the authentication information;
partitioning the output into (i) a component that identifies the authentication information and (ii) an encryption key component;
encrypting an item of cryptographic information via the encryption key component, wherein the item of cryptographic information comprises a mobile data management container credential stored on the server;
transferring (i) the component that identifies the authentication information and (ii) the encrypted mobile data management container credential from the server to a mobile platform;

storing, in non-volatile memory contained within the mobile platform, (i) the component that identifies the authentication information and (ii) the encrypted mobile data management container credential;

creating a list of one or more entries, wherein a respective one of the one or more entries comprises (i) an identifier for the user device associated with the authentication information and (ii) the pepper value corresponding to the user device associated with the authentication information; and providing the list to a policy server.

2. The method of claim 1, further comprising:
repeating at least said processing, partitioning, encrypting and storing steps for each of one or more items of authentication information associated with a user device.

3. The method of claim 2, wherein repeating at least said processing, partitioning, encrypting and storing steps for each of one or more items of authentication information associated with a user device comprises repeating said processing, partitioning, encrypting and storing steps for each token code that can be displayed by a user token.

4. The method of claim 1, further comprising:
providing the stored component that identifies the authentication information and the stored encrypted item of cryptographic information to a device.

5. The method of claim 4, wherein the device comprises a user mobile device.

6. The method of claim 1, wherein the authentication information comprises at least one of a token code and an emergency code.

7. The method of claim 1, further comprising:
creating a policy associated with the pepper value, wherein said policy defines content permitted on the user device.

8. The method of claim 1, wherein the mobile data management container credential comprises at least one of a key, an activation code, a password, and a cryptographic value used to protect a mobile data management container.

9. An article of manufacture comprising a processor-readable non-transitory storage medium having processor-readable instructions tangibly embodied thereon which, when implemented, cause a processor to carry out steps comprising:

processing authentication information generated by a server via a cryptographic operation to generate an output, wherein said processing comprises combining the authentication information with (i) a salt value and (ii) a pepper value based on a computed strength of a user device associated with the authentication information;

partitioning the output into (i) a component that identifies the authentication information and (ii) an encryption key component;

encrypting an item of cryptographic information via the encryption key component, wherein the item of cryptographic information comprises a mobile data management container credential stored on the server;

transferring (i) the component that identifies the authentication information and (ii) the encrypted mobile data management container credential from the server to a mobile platform;

storing, in non-volatile memory contained within the mobile platform, (i) the component that identifies the authentication information and (ii) the encrypted mobile data management container credential;

creating a list of one or more entries, wherein a respective one of the one or more entries comprises (i) an identifier for the user device associated with the authentication information and (ii) the pepper value corresponding to the user device associated with the authentication information; and providing the list to a policy server.

10. An apparatus comprising:
a memory; and
at least one processor coupled to the memory and configured to:

process authentication information generated by a server via a cryptographic operation to generate an output, wherein said processing comprises combining the authentication information with (i) a salt value and (ii) a pepper value based on a computed strength of a user device associated with the authentication information;

partition the output into (i) a component that identifies the authentication information and (ii) an encryption key component;

encrypt an item of cryptographic information via the encryption key component, wherein the item of cryptographic information comprises a mobile data management container credential stored on the server;

transfer (i) the component that identifies the authentication information and (ii) the encrypted mobile data management container credential from the server to a mobile platform;

store, in non-volatile memory contained within the mobile platform, (i) the component that identifies the authentication information and (ii) the encrypted mobile data management container credential;

create a list of one or more entries, wherein a respective one of the one or more entries comprises (i) an identifier for the user device associated with the authentication information and (ii) the pepper value corresponding to the user device associated with the authentication information; and provide the list to a policy server.

11. A method comprising:
processing authentication information inputted by a user onto a mobile platform via a cryptographic operation to generate an output, wherein said processing comprises combining the authentication information with (i) a salt value and (ii) a pepper value based on a computed strength of a user device associated with the authentication information;

partitioning the output into (i) a component that identifies the authentication information and (ii) a decryption key component;

determining whether the component that identifies the authentication information matches a stored component transferred from a server and stored in non-volatile memory contained within the mobile platform;

decrypting a stored encrypted item of cryptographic information, transferred from the server, via the decryption key component if the component that identifies the authentication information matches a stored component, wherein the stored encrypted item of cryptographic information (i) is associated with the stored component, (ii) comprises a mobile data management container credential, and (iii) is stored in non-volatile memory contained within the mobile platform;

transferring the decrypted mobile data management container credential to a mobile data management container within the mobile platform for use therewith;

creating a list of one or more entries, wherein a respective one of the one or more entries comprises (i) an identifier for the user device associated with the authentication information and (ii) the pepper value corresponding to the user device associated with the authentication information; and providing the list to a policy server.

12. The method of claim 11, further comprising:

processing different authentication information via a cryptographic operation if the component that identifies the authentication information does not match a stored component.

13. The method of claim 11, wherein the mobile data management container credential comprises at least one of a key, an activation code, a password, and a cryptographic value used to protect a mobile data management container.

14. The method of claim 11, wherein the mobile data management container credential comprises a token code.

15. An article of manufacture comprising a processor-readable non-transitory storage medium having processor-readable instructions tangibly embodied thereon which, when implemented, cause a processor to carry the steps comprising:

processing authentication information inputted by a user onto a mobile platform via a cryptographic operation to generate an output, wherein said processing comprises combining the authentication information with (i) a salt value and (ii) a pepper value based on a computed strength of a user device associated with the authentication information;

partitioning the output into (i) a component that identifies the authentication information and (ii) a decryption key component;

determining whether the component that identifies the authentication information matches a stored component transferred from a server and stored in non-volatile memory contained within the mobile platform;

decrypting a stored encrypted item of cryptographic information, transferred from the server, via the decryption key component if the component that identifies the authentication information matches a stored component, wherein the stored encrypted item of cryptographic information (i) is associated with the stored component, (ii) comprises a mobile data management container credential, and (iii) is stored in non-volatile memory contained within the mobile platform;

transferring the decrypted mobile data management container credential to a mobile data management container within the mobile platform for use therewith;

creating a list of one or more entries, wherein a respective one of the one or more entries comprises (i) an identifier for the user device associated with the authentication information and (ii) the pepper value corresponding to the user device associated with the authentication information; and providing the list to a policy server.

16. An apparatus comprising:

a memory; and at least one processor coupled to the memory and configured to:

process authentication information inputted by a user onto a mobile platform via a cryptographic operation to generate an output, wherein said processing comprises combining the authentication information with (i) a salt value and (ii) a pepper value based on a computed strength of a user device associated with the authentication information;

partition the output into (i) a component that identifies the authentication information and (ii) a decryption key component;

determine whether the component that identifies the authentication information matches a stored component transferred from a server and stored in non-volatile memory contained within the mobile platform;

decrypt a stored encrypted item of cryptographic information, transferred from the server, via the decryption key component if the component that identifies the authentication information matches a stored component, wherein the stored encrypted item of cryptographic information (i) is associated with the stored component, (ii) comprises a mobile data management container credential, and (iii) is stored in non-volatile memory contained within the mobile platform;

transfer the decrypted mobile data management container credential to a mobile data management container within the mobile platform for use therewith;

create a list of one or more entries, wherein a respective one of the one or more entries comprises (i) an identifier for the user device associated with the authentication information and (ii) the pepper value corresponding to the user device associated with the authentication information; and provide the list to a policy server.

17. The article of manufacture of claim 9, wherein the mobile data management container credential comprises at least one of a key, an activation code, a password, and a cryptographic value used to protect a mobile data management container.

18. The article of manufacture of claim 9, wherein the authentication information comprises at least one of a token code and an emergency code.

19. The apparatus of claim 10, wherein the mobile data management container credential comprises at least one of a key, an activation code, a password, and a cryptographic value used to protect a mobile data management container.

20. The apparatus of claim 10, wherein the authentication information comprises at least one of a token code and an emergency code.

* * * * *